(12) United States Patent
Toyama et al.

(10) Patent No.: US 7,835,505 B2
(45) Date of Patent: Nov. 16, 2010

(54) PHONE-TO-MONITOR CONNECTION DEVICE

(75) Inventors: Kentaro Toyama, Redmond, WA (US); Sean O. Blagsvedt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 11/129,675

(22) Filed: May 13, 2005

(65) Prior Publication Data
US 2006/0259942 A1    Nov. 16, 2006

(51) Int. Cl.
*H04M 11/00* (2006.01)
(52) U.S. Cl. .............................. 379/90.01; 379/102.03; 725/130; 725/141; 348/552
(58) Field of Classification Search .............. 379/90.01, 379/93.05, 93.06, 93.07, 102.03; 707/1, 707/200, 106; 725/60, 110, 133, 141; 455/420, 455/557; 348/552
See application file for complete search history.

(56) References Cited

U.S. PATENT DOCUMENTS

| | | | |
|---|---|---|---|
| 6,489,986 B1 * | 12/2002 | Allen ....................... | 348/14.01 |
| 6,543,052 B1 * | 4/2003 | Ogasawara ................. | 725/60 |
| 6,781,635 B1 * | 8/2004 | Takeda ....................... | 348/552 |
| 7,158,757 B2 * | 1/2007 | Buttet ....................... | 455/41.3 |
| 7,312,813 B1 * | 12/2007 | Heinonen ................... | 348/158 |
| 2002/0091794 A1 * | 7/2002 | Moran et al. ................ | 709/218 |
| 2002/0149705 A1 * | 10/2002 | Allen et al. ................. | 348/734 |
| 2003/0040334 A1 * | 2/2003 | Lee ............................ | 455/557 |
| 2004/0034873 A1 * | 2/2004 | Zenoni ....................... | 725/135 |
| 2005/0064860 A1 * | 3/2005 | DeLine ....................... | 455/420 |
| 2006/0004685 A1 * | 1/2006 | Pyhalammi et al. ............ | 707/1 |

OTHER PUBLICATIONS

Nokia—Image Viewer Features, Copyright Nokia 2005 (1 page) http://www.nokia.com/nokia/0,4879,5788.00.html.
Nokia—Image Viewer Full Specifications, Copyright Nokia 2005 (1 page) http://www.nokia.com/nokia/0,4879,5789,00.html.
Nokia—Image Viewer FAQ/General, Copyright Nokia 2005 (3 pages) http://www.nokia.com/nokia/0,4879,5791,00.html.
Nokia—Image Viewer FAQ/Images and Slideshows, Copyright Nokia 2005 (2 pages) http://www.nokia.com/nokia/0,4879,5792,00.html.
Nokia—Image Viewer Demo, Copyright Nokia 2005 (1 page) http://www.nokia.com/nokia/0,4879,5790,00.html.
Nokia—Image Viewer Demo, Copyright Nokia 2005 (1 page).
Nokia—Image Viewer Demo, Copyright 2005 Nokia (1 page) http://www.nokia.com/nokia/0,4879,5790,00.html.

(Continued)

*Primary Examiner*—Melur Ramakrishnaiah
(74) *Attorney, Agent, or Firm*—Perkins Coie LLP

(57) ABSTRACT

A device for connecting a phone to a television so that content available via the phone can be rendered on the television is provided. The phone-to-television device includes a telephone interface for receiving content from and sending commands to the connected phone and includes a television interface for transmitting the received content for rendering on the connected television. The phone-to-television device includes a converter for converting content received from the phone into a television format and includes a transmission component for transmitting the formatted content for display on the television. As the user interacts with the phone, the user can view on the television the content that is provided by the phone.

18 Claims, 13 Drawing Sheets

OTHER PUBLICATIONS

Steve's Digicams—Pentax Optio S50—User Review, Copyright 2004 Steve's Digicam Online, Inc. (9 pages) http://www.steves-digicams.com/2004_reviews/optios50.html.

Showtimer(TM) by X10, Copyright 1997-2005 X10.com (6 pages) http://www.x10.com/products/vk73a_sg5_gen.htm.

Video Output to Television Monitors, Copyright 2000-2002 Dr. John Park for Science Junction, NC State University (2 pages) http://www.ncsu.edu/sciencejunction/route/usetech/digitalcamera/monitor/vidoutput.html.

Griffin Technology, Copyright 2005 (2 pages) http://www.griffintechnology.com/products/itrip.

Griffin Technology, Copyright 2005 (1 page) http://www.griffintechnology.com/products/itrip/techspecs.php.

Griffin Technology, Copyright 2005 (1 page) http://www.griffintechnology.com/products/itrip/features.php.

Reviews, Griffin Technologies (2 pages).

* cited by examiner

Main Menu
1. Echo Display
2. Web Browse
3. Images
4. Audio
5. Games
Press phone button to select option.
*FIG. 2A*
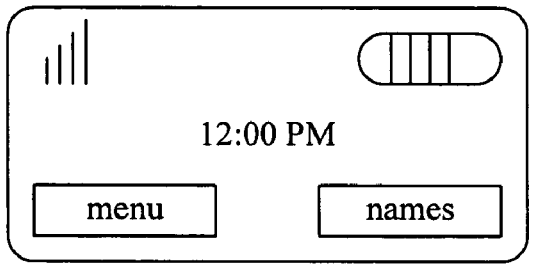
*FIG. 2B*
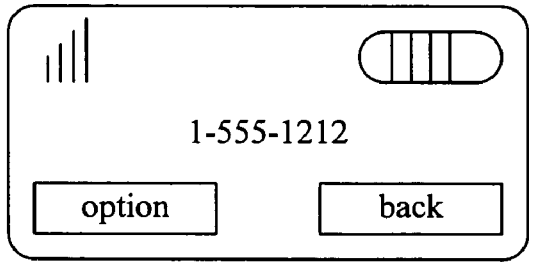
*FIG. 2C* presentation mode

Audio Mode

1. Telephone
2. Audio Server

FIG. 2G

Audio Mode

Now Playing
Beethoven's
5$^{th}$ Symphony
1$^{st}$ Movement

8:57 left

FIG. 2H

ABSTRACT/FRONT MATTER

PHONE-TO-MONITOR CONNECTION DEVICE

TECHNICAL FIELD

The described technology relates generally to rendering information that is available via a telephone, such as a mobile phone.

BACKGROUND

It can be particularly challenging to view images and other content on small devices such as mobile phones, mobile computers, and personal digital assistants ("PDAs"). These devices typically have a very small display area in which to display a display page. To display the display page, the devices may use software and information that is designed for devices with much larger display areas. For example, these devices may use a web browser to display standard size web pages. If a display page in a high resolution is displayed in such a small display area, the display page may need to be displayed in a much lower resolution to fit the entire display page. With such a low resolution, however, the user may not be able to see the details of the display page. Alternatively, if the display page is displayed in full resolution in a small display area, only a small portion of the display page can be displayed at a time. To view other portions of the display page, the user needs to navigate (e.g., scroll and zoom) to view those portions. Because such devices are typically very small, it can be difficult for a user to perform such navigation. As another example, mobile phones typically maintain a telephone list that includes the names and telephone numbers of frequently called people. Because a telephone list can contain a large number of telephone numbers, it can be difficult to view and maintain the telephone list through a small display area.

Because of these limitations of displaying information on the display area of a small device, many owners of small devices use a desktop personal computer with a large display area to access web pages, telephone lists, and other information that is also available via a small device. In many countries, however, although consumers can afford a mobile phone, consumers cannot afford a personal computer. Moreover, even if a consumer could afford a personal computer, the consumer may not purchase one because the consumer may not understand the benefits of a personal computer or may not need those benefits. As a result, the consumers are left to access such information using their mobile phones even with its limitations as described above.

It would be desirable to provide a technique by which a consumer could access the information available via a mobile phone or other small device on a large area without having to purchase a personal computer.

SUMMARY

A device for connecting a phone to a monitor so that content available via the phone can be rendered on the monitor is provided. A phone-to-monitor device connects to a phone and a monitor. The phone-to-monitor device includes a telephone interface for receiving content from and sending commands to the connected phone and includes a monitor interface for transmitting the received content for rendering (i.e., displaying) on the connected monitor. The phone-to-monitor device includes a converter for converting content received from the phone into a monitor format and includes a transmission component for transmitting the formatted content for display on the monitor. As the user interacts with the phone, the user can view on the monitor the content that is provided by the phone. In one embodiment, the phone acts as a user input device for the phone-to-monitor device. Thus, users who cannot afford or who do not have access to a personal computer can use a monitor, such as the ubiquitous television, as a display device for a phone.

BRIEF DESCRIPTION OF THE DRAWINGS

FIGS. 2A-2H are display pages that illustrate the user interface of a phone-to-television device in one embodiment.

DETAILED DESCRIPTION

Figure 1:
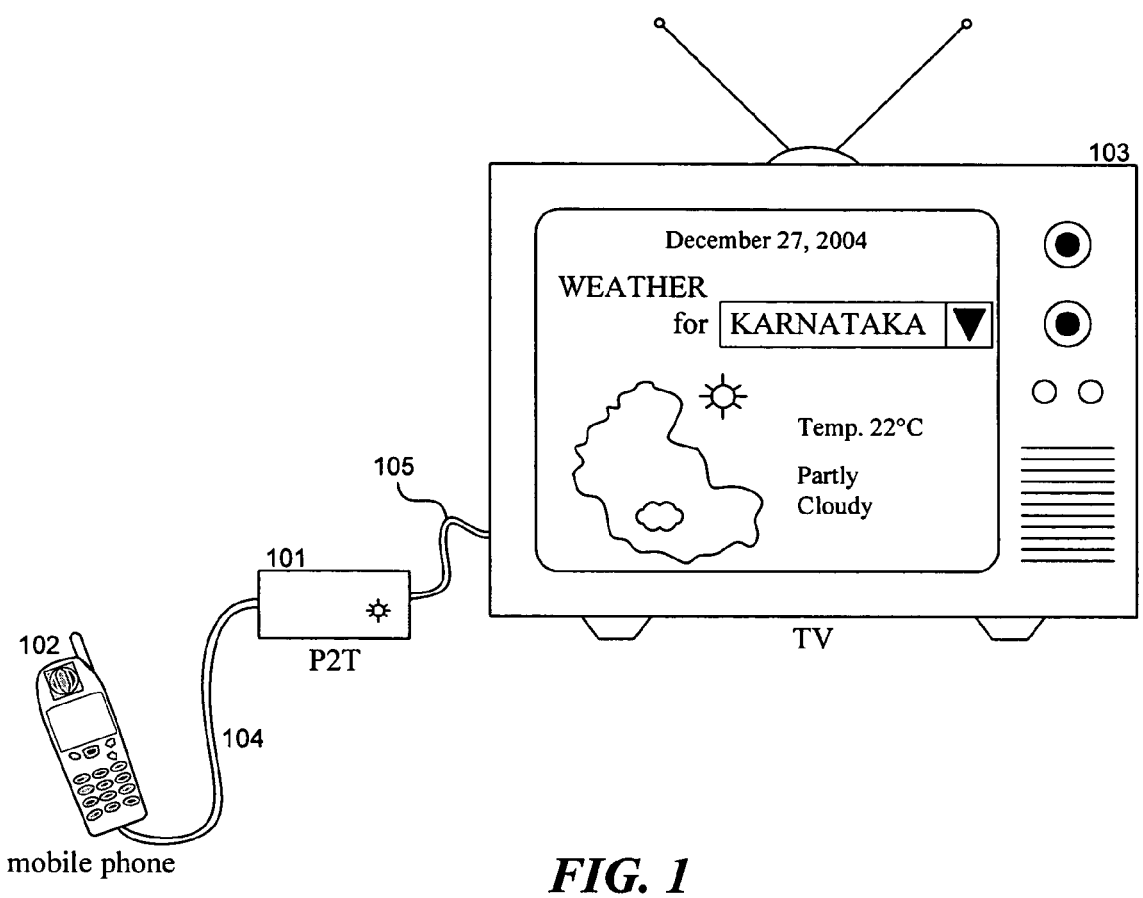
FIG. 1 is a diagram that illustrates the use of a phone-to-television device that connects to a standard mobile phone and television via cables in one embodiment.

A device for connecting a phone to a monitor so that content available via the phone can be rendered on the monitor is provided. A monitor is any display device that operates in such a way that the incoming display signal (e.g., NTSC for television) does not require additional digital processing by the device to be displayed. Televisions are a very common monitor. In one embodiment, when the monitor is a television, a phone-to-television device connects to a phone and the television. The phone-to-television device includes a telephone interface for receiving content from and sending commands to the connected phone and includes a television interface for transmitting the received content for rendering (e.g., displaying) on the connected television. The phone-to-television device includes a converter for converting content received from the phone into a television format (e.g., NTSC or PAL) and includes a transmission component for transmitting the formatted content to the television (e.g., via airwaves or cable). For example, the content sent by the phone to the phone-to-television device may include the content that is displayed on the display area of the phone during normal operation. As the user interacts with the phone, the user can view on the television the content that is also displayed on the phone. The content that is displayed on the television may be in the same resolution as the content that is displayed on the phone or may be in a higher resolution. For example, a phone that includes a digital camera may store the images in a resolution that is higher than that of the display area of the phone and send that higher resolution image to the phone-to-television device for display on the television. As another example, a phone that receives an HTML document for rendering on the display area of the phone may send that HTML document to the phone-to-television device. The phone-to-television device may then generate a bitmap image of the HTML document, which is then transmitted to the television in a television format. Because of the small display area of a phone, the phone may only display a portion of the HTML document at a time. The use of the phone-to-television device allows a larger portion of the HTML document to be displayed at a time. In this way, users who cannot afford or who do not have access to a personal computer can use the ubiquitous television as a display device for a phone. Moreover, even if personal computers are common in a country, it is likely that monitors, such as televisions, are more common.

In one embodiment, the phone-to-television device may receive user input via the keypad and navigation controls of a phone. For example, if a web page is currently being displayed on the television, upon receiving an indication that the user has selected the right arrow of the navigation controls, the phone-to-television device may display an indication that the next field of the web page is selected. Upon receiving an indication that the user selected the selection button of the navigation controls, the phone-to-television device may send an HTTP request to the phone, which is in turn forwarded to a web server. When the phone receives the HTTP response, for example, including an HTML document describing a web page, it sends the response to the phone-to-television device for display of the web page on the television. As another example, the phone-to-television device may include an image display component that allows images provided by the phone to be displayed on the television. The phone-to-television device may receive thumbnails of images stored on the phone. The phone-to-television device may display the image thumbnails to the television and allow the user to browse through the image thumbnails by using the navigation controls of the phone. When a user selects an image thumbnail, the phone-to-television device may request the phone to provide that image in high resolution. Upon receiving the image, the phone-to-television device displays the image to the television.

In one embodiment, the phone-to-television device may receive audio content from a phone, convert the audio content to a television format, and transmit the converted audio content to the television for output through the speakers of the television. In one embodiment, a phone-to-speaker device may be used to allow audio content of a phone to be transmitted to a device with speakers such as a television, radio, CD player, and so on. The audio content may include a phone conversation, a music file, streaming audio data, and so on. The phone-to-speaker device may display a catalog of available audio content provided by the phone so that the user can select the audio content to be played.

FIG. 1 is a diagram that illustrates the use of a phone-to-television device that connects to a standard mobile phone and television via cables in one embodiment. A phone-to-television device 101 is connected to a mobile phone 102 and a television 103 via cables 104 and 105. The phone-to-television device may be connected to the mobile phone through its standard data connection port and may be connected to the television via a cable television port. In this example, the phone-to-television device is displaying a web page that the mobile phone provided to the phone-to-television device. The phone-to-television device interacts with the mobile phone to receive the HTML documents describing the web page and generates a bitmap of a web page from the HTML document. The phone-to-television device converts the bitmap to a television format for transmission to the television. The user may use the keypad of the phone to navigate through the web page. For example, if the mobile phone does not include navigation controls, the phone-to-television device can interpret the numbers of the keypad to correspond to a different navigation control. For example, the "6" may be interpreted to be a right arrow. A user may navigate to the drop-down list box 104 that is displayed on the television and enter a down arrow (e.g., "8") to display the names on the drop-down list.

Figure 2D:
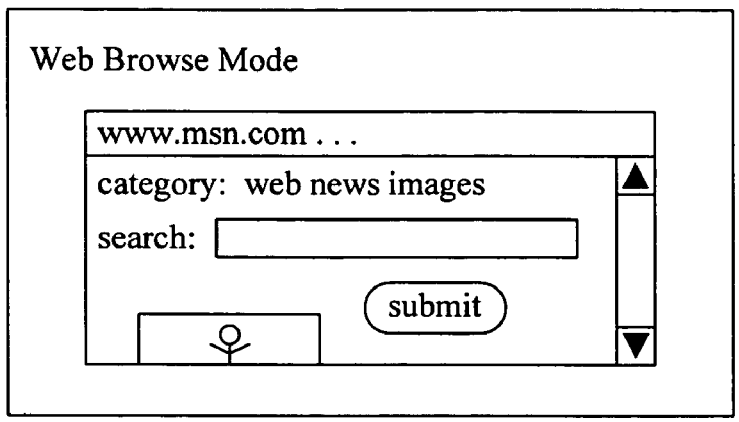
Figure 2E:
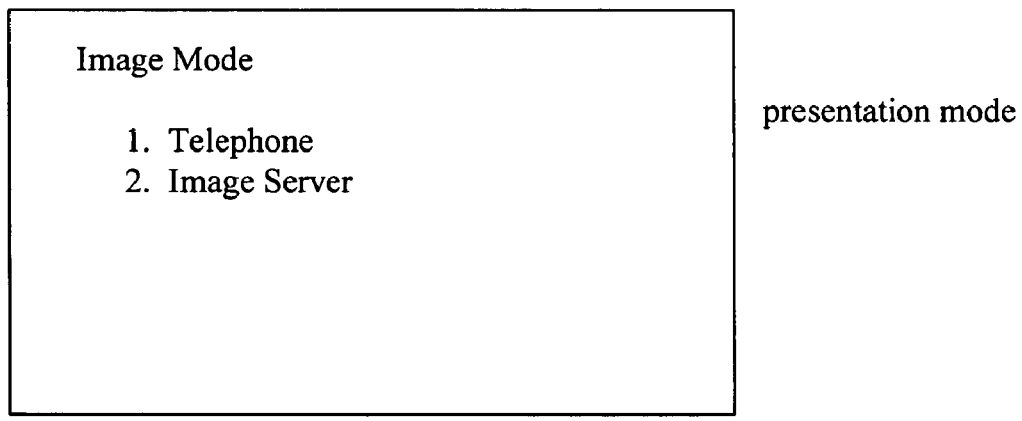
Figure 2F:
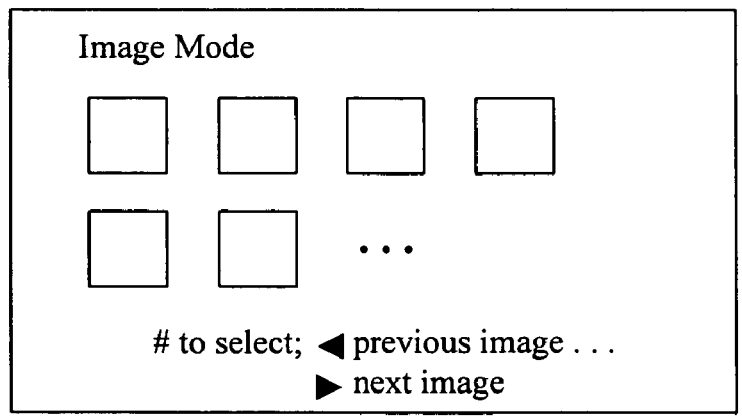

FIGS. 2A-2H are display pages that illustrate the user interface of a phone-to-television device in one embodiment. FIG. 2A is a display page that illustrates the display on the television of the main menu. In this example, the phone-to-television device provides the menu items of echo, web browse, image, audio, and games. When a user selects a number via the keypad of the phone corresponding to one of the menu items, the phone-to-television device enters a mode associated with that menu item. FIG. 2B is a display page that illustrates the display on the television when the user has selected the echo menu item. When in the echo mode, the phone-to-television device receives the content that is currently being displayed on the phone and transmits that same content in a television format to the television. Thus, the phone-to-television device may function simply as an alternate display device for the mobile phone. FIG. 2C is a display page that illustrates the display on the television when a user enters a phone number at the telephone. When in the echo mode, the phone-to-television device may not receive indications of user input, but rather, the mobile phone may use the user input to change the content of its display and then send the new content to the phone-to-television device so that it can be echoed to the television. FIG. 2D is a display page that illustrates the display on the television of a web page when the phone-to-television device is in the web browse mode. In this example, when the user selected the web browse menu item, the phone-to-television device sent to the phone an HTTP request for a default web page. The phone in turn forwarded the request to a web server, received an HTML document, and forwarded the HTML document to the phone-to-television device. Upon receiving the HTML document, the phone-to-television device rendered the web page a buffer for transmission to the television in a television format. FIG. 2E is a display page that illustrates the display on the television of a sub-menu when the image mode is entered. When in the image mode, the phone-to-television device allows the user to select a telephone mode or a server mode. In the telephone mode, the phone-to-television device coordinates the display on the television of images stored at the phone. In the server mode, the phone-to-television device coordinates the downloading of images from an image server and the display on the television of the downloaded images. FIG. 2F is a display page that illustrates the display on the television of image thumbnails. As a user selects navigation controls such as go to next thumbnail or go to next page, the phone-to-television device navigates through the image thumbnails. When the user selects a thumbnail, the phone-to-television device displays on the television the image represented by the selected thumbnail. FIG. 2G is a display page that illustrates the display on the television of a sub-menu when the audio mode is entered. The audio sub-menu items behave in a way that is analogous to the sub-menu items of the image mode. FIG. 2H is a display page that illustrates the display on the television when audio is being transmitted to the television. The phoneto-television device may generate the display based on metadata associated with the audio content.

Figure 3:
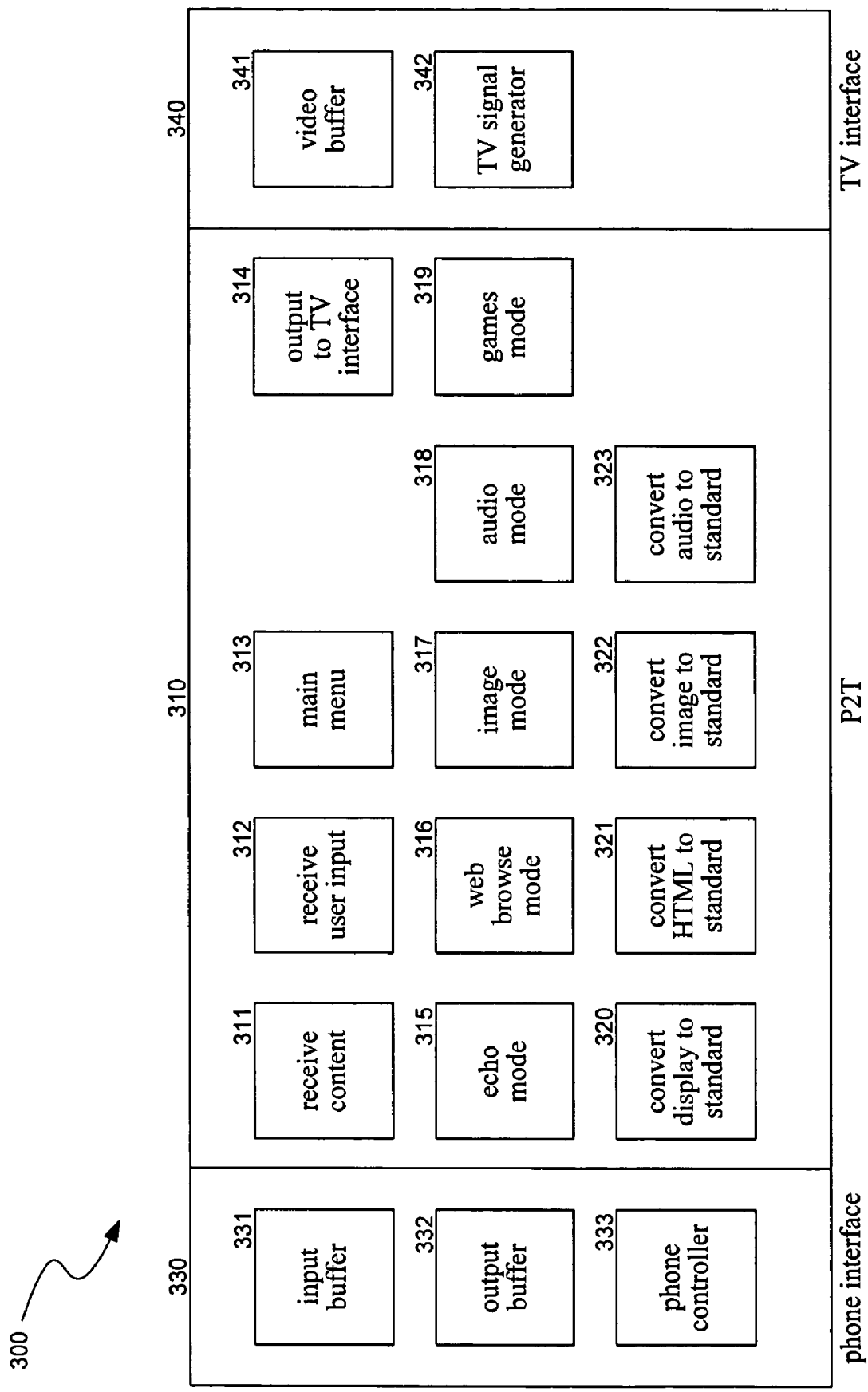
FIG. 3 is a block diagram that illustrates the components of the phone-to-television device in one embodiment.

FIG. 3 is a block diagram that illustrates the components of the phone-to-television device in one embodiment. The phone-to-television device 300 includes a processing module 310, a phone interface 330, and a television interface 340. The phone interface provides a connection to a mobile phone. The connection may be via a cable or a wireless connection such as WiFi or Bluetooth. The phone interface receives data (e.g., content and user input) from the connected mobile phone and stores the data in the input buffer 331 and receives commands from the processing module and stores commands in the output buffer 332. A phone controller component 333 passes the data of the input buffer to the processing module and sends the commands from the output buffer to the mobile phone. The phone controller component may be customized to the exposed interface of a particular mobile phone with which the phone-to-television device is compatible. Alternatively, a standard interface may be used by mobile phones that are compatible with phone-to-television devices. The television interface provides a connection to a television. The connection may be via cable or a wireless connection. The television interface provides a video buffer 341 and a TV signal generator component 342. The television interface receives the frames of video from the processing module and stores them in the video buffer. The TV signal generator component converts the content of the video buffer to a television format and transmits the content to the television.

The processing module includes components 311-323 that receive content from the phone interface, transmit commands to the phone interface, and output content to the TV interface for display on the television. The main menu component 313 controls the user interface that is presented to the user as input via the mobile phone and as output via the television. The main menu component allows the user to select various menu options and places the device in the appropriate mode. A receive content component 311 receives content from the phone interface and distributes the content to the appropriate component of the processing module. A receive user input component 312 receives from the phone interface indications of user input such as selection of a button on the mobile phone keypad and distributes the indications to the appropriate component. An echo display mode component 315, a web browse mode component 316, an image mode component 317, an audio mode component 318, and a games mode component 319 provide the processing for the corresponding mode. Other components are possible to convert data from the phone in any format to a television format. A convert display to standard component 320, a convert HTML to standard component 321, a convert image to standard component 322, a convert audio to standard component 323 each provide the processing to convert content received via the phone interface into a standard format. For example, the convert HTML to standard component may input an HTML document and generate a bitmap of the web page described by the document. An output to TV interface component 314 provides the converted content to the TV interface for storage in the video buffer.

Figure 4:
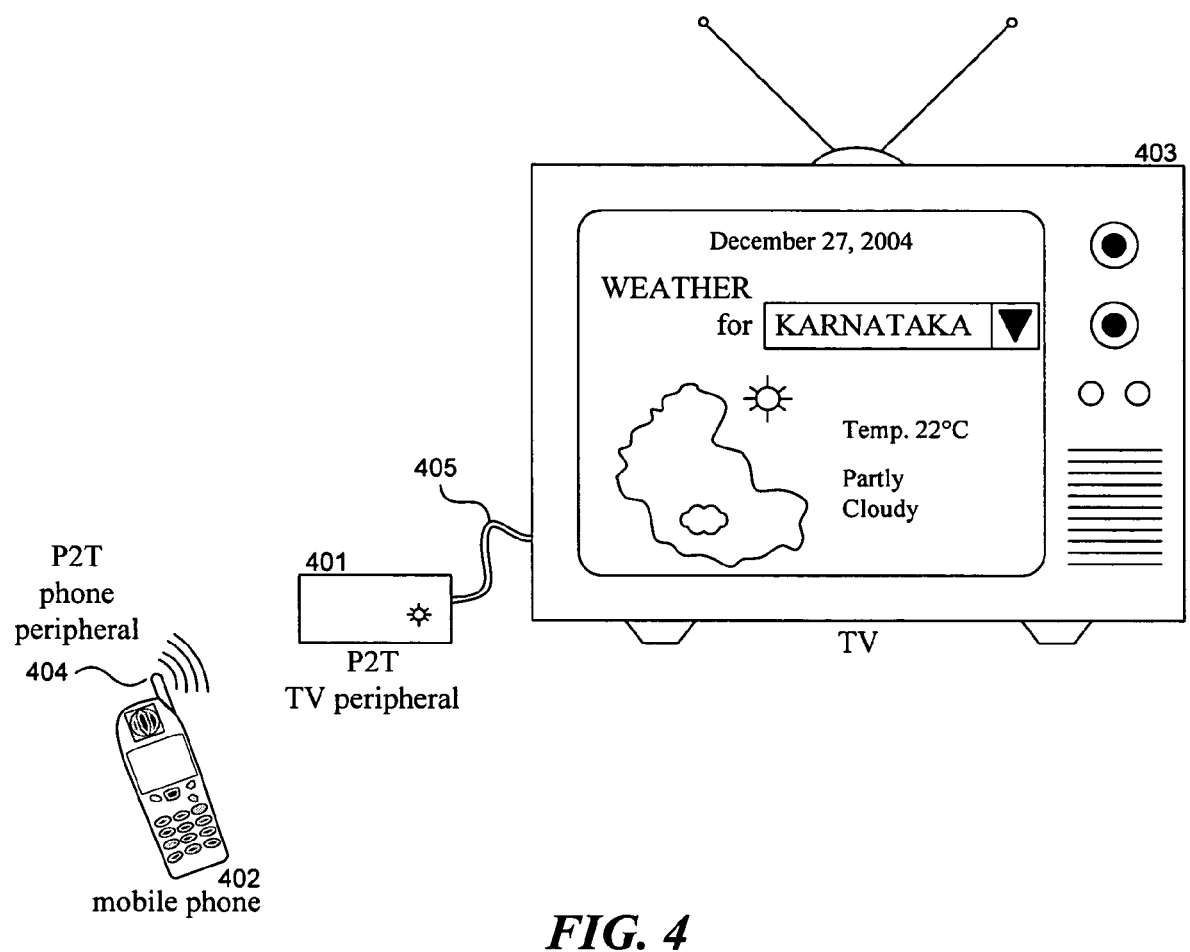
FIG. 4 is a diagram that illustrates a wireless phone peripheral that attaches to a phone and connects to a television peripheral to provide the functions of the phone-to-television device.

FIGS. 4-7 are diagrams that illustrate various configurations of the phone-to-television device. FIG. 4 is a diagram that illustrates a wireless phone peripheral that attaches to a phone and connects to a television peripheral to provide the functions of the phone-to-television device. A television peripheral 401 connects to a television 403 via a cable 405, and a phone peripheral 404 is directly connected to a mobile phone 402 through its attachment. The phone peripheral includes a connector for the phone peripheral to the mobile phone. The phone peripheral also includes a wireless connection, such as WiFi or Bluetooth, to the television peripheral. The functions of the phone-to-television device may be distributed between the phone peripheral and the television peripheral in various ways. For example, the phone peripheral may not perform any of the functions of the phone-to-television device as described above, but rather simply may replace the wire between the mobile phone and the phone-to-television device with a wireless connection. Alternatively, the phone peripheral may implement some or all of the functions of the phone interface of the phone-to-television device as described above.

Figure 5:
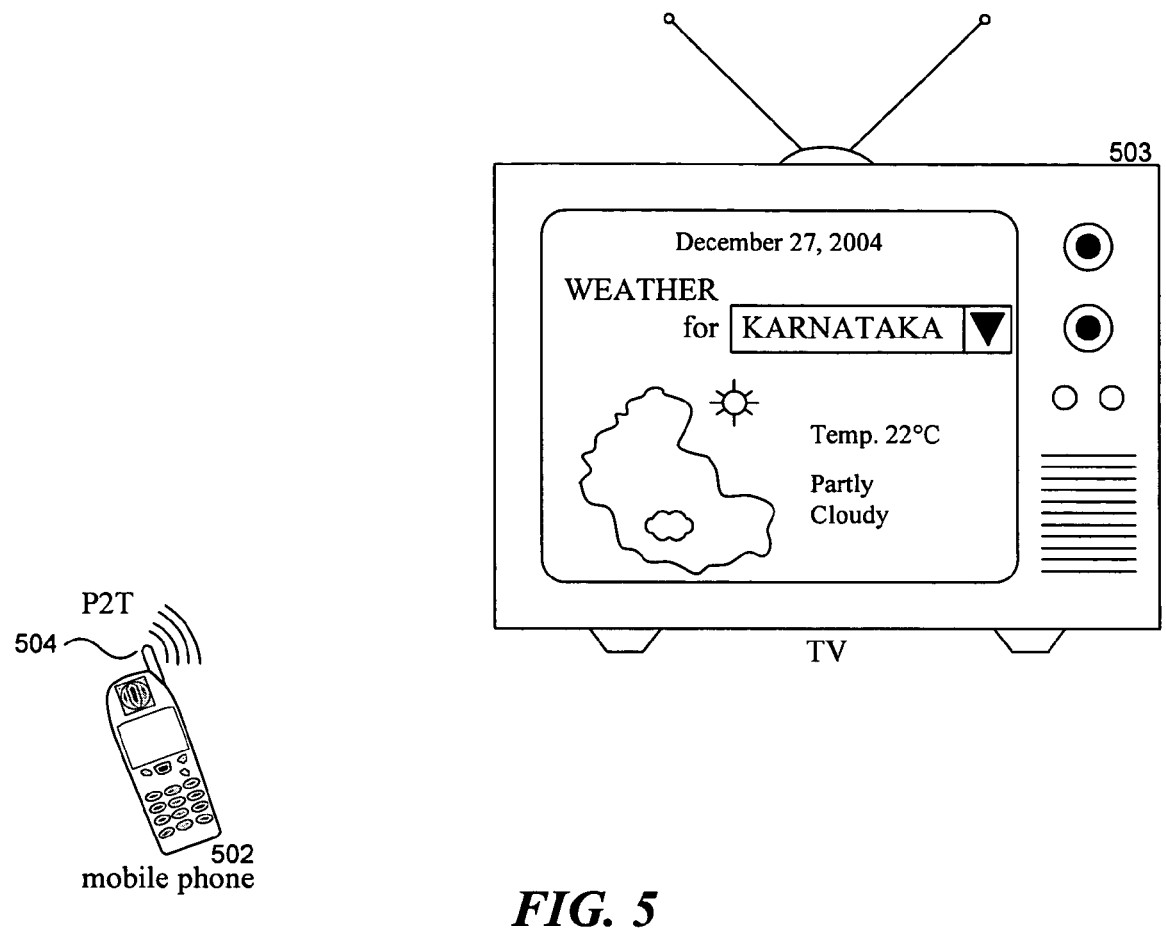
FIG. 5 is a diagram that illustrates a phone-to-television device that attaches to a mobile phone and has a wireless connection to a television.
Figure 6:
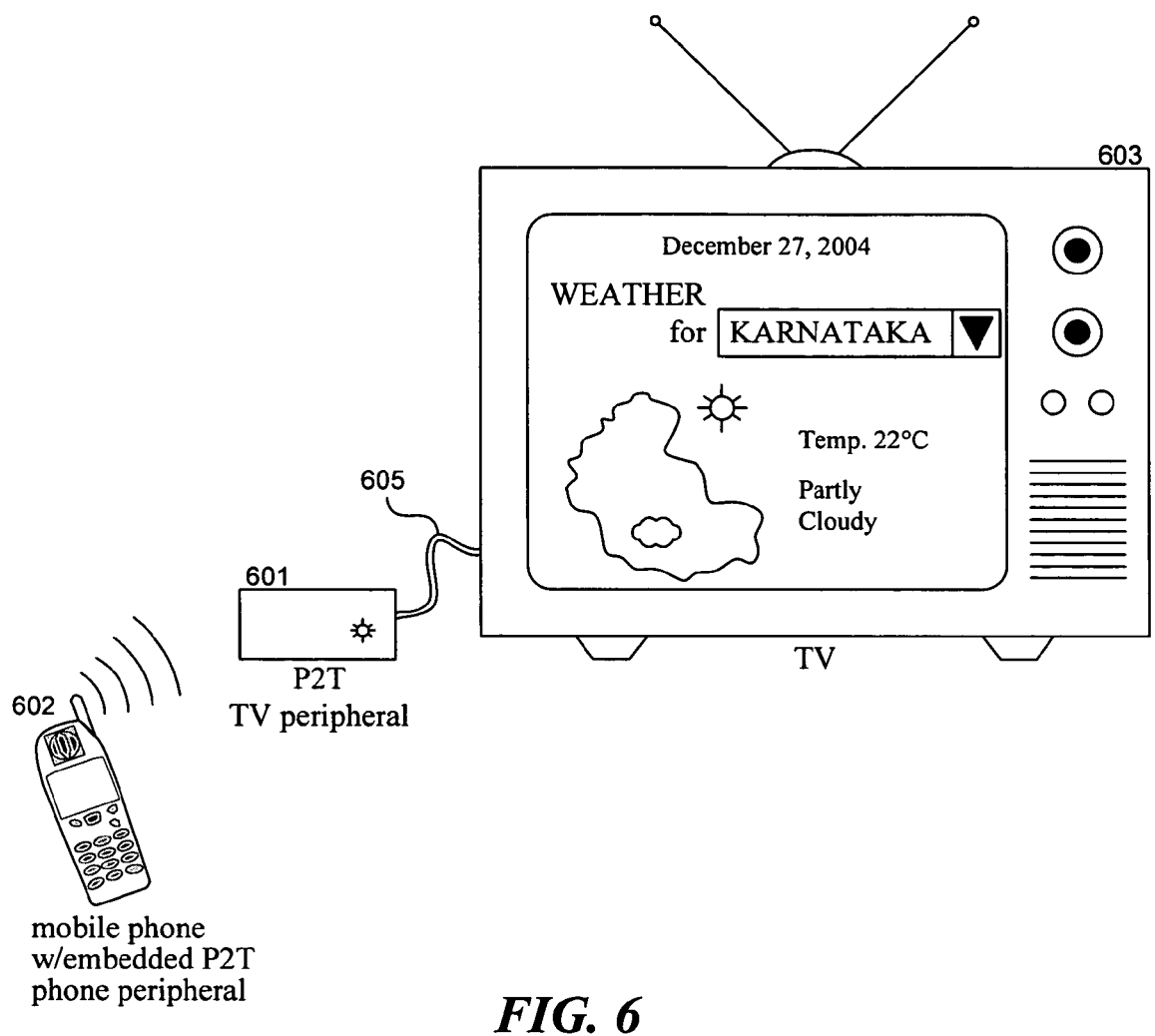
FIG. 6 is a diagram that illustrates a wireless phone peripheral embedded in a mobile phone that connects to a television peripheral to provide the functions of the phone-to-television device.
Figure 7:
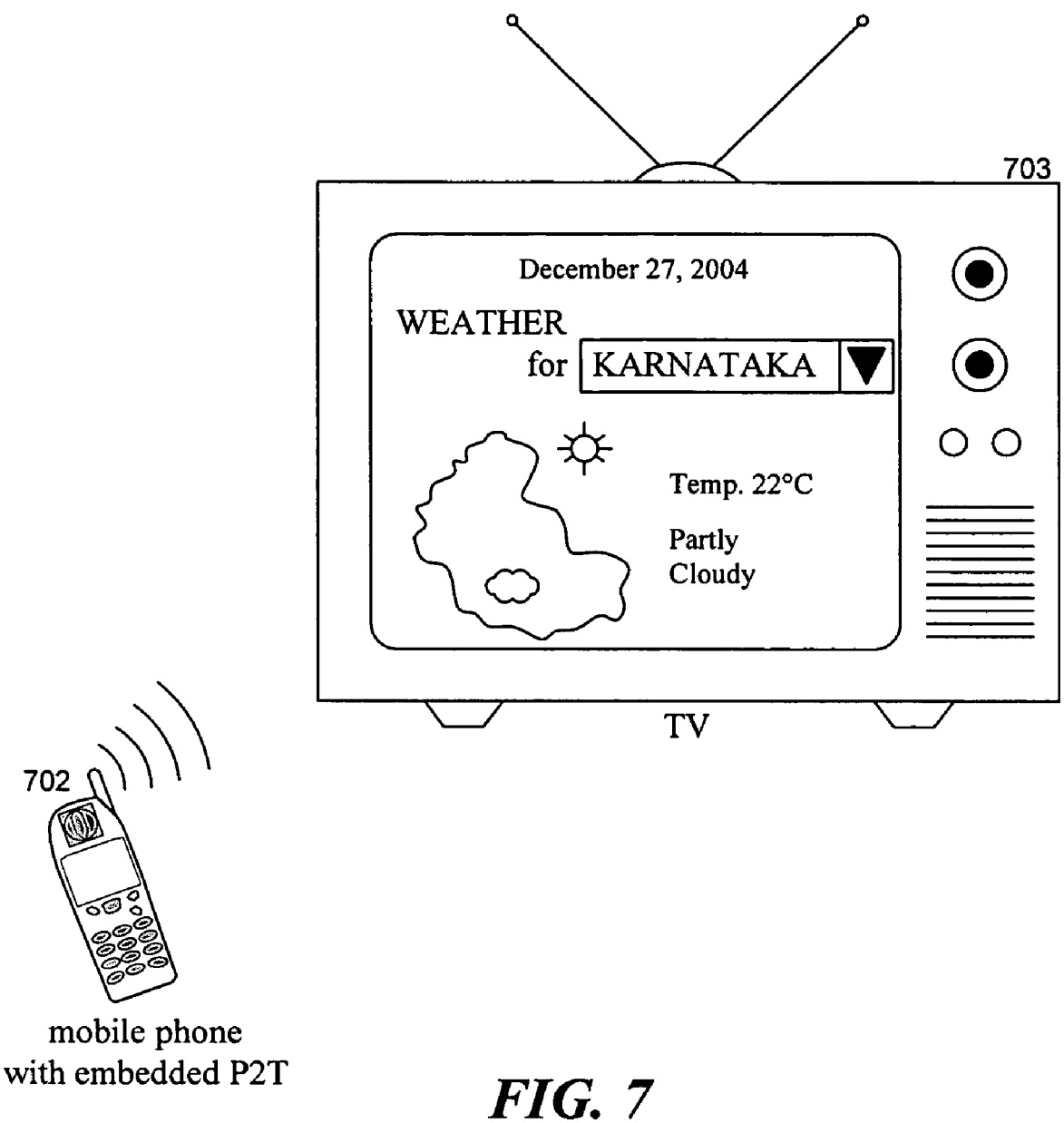
FIG. 7 is a diagram that illustrates a configuration of the phone-to-television device that is embedded in a mobile phone.

FIG. 5 is a diagram that illustrates a phone-to-television device that attaches to a mobile phone and has a wireless connection to a television. A mobile phone 502 attaches to a phone-to-television device 504 via a direct connection through the attachment. The phone-to-television device may include a slot, cradle, connector, and so on into which the mobile phone fits for establishing the connection between the phone and the device. The phone-to-television device transmits content to a television 503 using standard television format. FIG. 6 is a diagram that illustrates a wireless phone peripheral embedded in a mobile phone that connects to a television peripheral to provide the functions of the phone-to-television device. This configuration is similar to that of FIG. 4, except that the phone peripheral is embedded in and is a component of the mobile phone. FIG. 7 is a diagram that illustrates a configuration of the phone-to-television device that is embedded in a mobile phone. In this configuration, the phone-to-television device is embedded in and is a component of a mobile phone 702. The phone-to-television device transmits content to a television 703 using standard television format. One skilled in the art will appreciate that many other variations of these configurations can be used. For example, each wireless connection can be replaced by a wire connection.

The phone-to-television device may include a central processing unit and memory. The memory is a computer-readable medium that contains instructions that implement the phone-to-television system. In addition, the content, commands, data structures, and message structures used by the phone-to-television device may be stored or transmitted via a data transmission medium, such as a signal on a communication link. The phone-to-television device may download update instructions and data structures via a phone to which it is connected. The phone-to-television device may provide an interface to various devices with phones, including consumer electronic devices, mobile phones, mobile phones with cameras, personal digital assistants ("PDAs"), smart phones, and so on. The phone-to-television device may be described in the general context of computer-executable instructions, such as program modules, executed by a central processing unit. Generally, program modules include routines, programs, objects, components, data structures, and so on that perform particular tasks or implement particular abstract data types. Typically, the functionality of the program modules may be combined or distributed as desired in various embodiments. In addition, components of the phone-to-television device may be implemented in hardware. For example, the functions of the TV signal generator component may be provided by an electronic device, such as a chip. The phone-to-television device may transmit content to a television in various television formats such as video input, RGB input, cable input, VHF/UHF, and so on and may transmit content to the phone using various wireless formats such as Bluetooth, WiFi, WiMax, RF signals, infrared signals, and so on. In one embodiment, the phone-to-television device receives and sends data only though the connections to the phone and the television and has no other connection to any device.

One skilled in the art will appreciate that various capabilities can be added to the phone-to-television device. The phone-to-television device may include a component to decompress and decode content received from the phone. For example, the content may be received in various compressed formats such as JPEG, MPEG, and so on. The phone-to-television device may also include a component that caches content received from the phone for display on the television when the phone-to-television device is not connected to the phone. For example, the phone-to-television device may cache sports scores, security prices, weather information, and so on for display at a later time. The caching allows the television to continue to display the content even when the phone is disconnected from the phone-to-television device. The phone-to-television device may display content on the television in a way that overlays only a portion of the display. The phone-to-television device may access location information and user identification of the phone. The location information may be used to customize the content that is displayed on the television to the current location. The user identification information may be used for security purposes and may be provided to the television or a set-top box through which the phone-to-television device is connected to the television.

Figure 8:
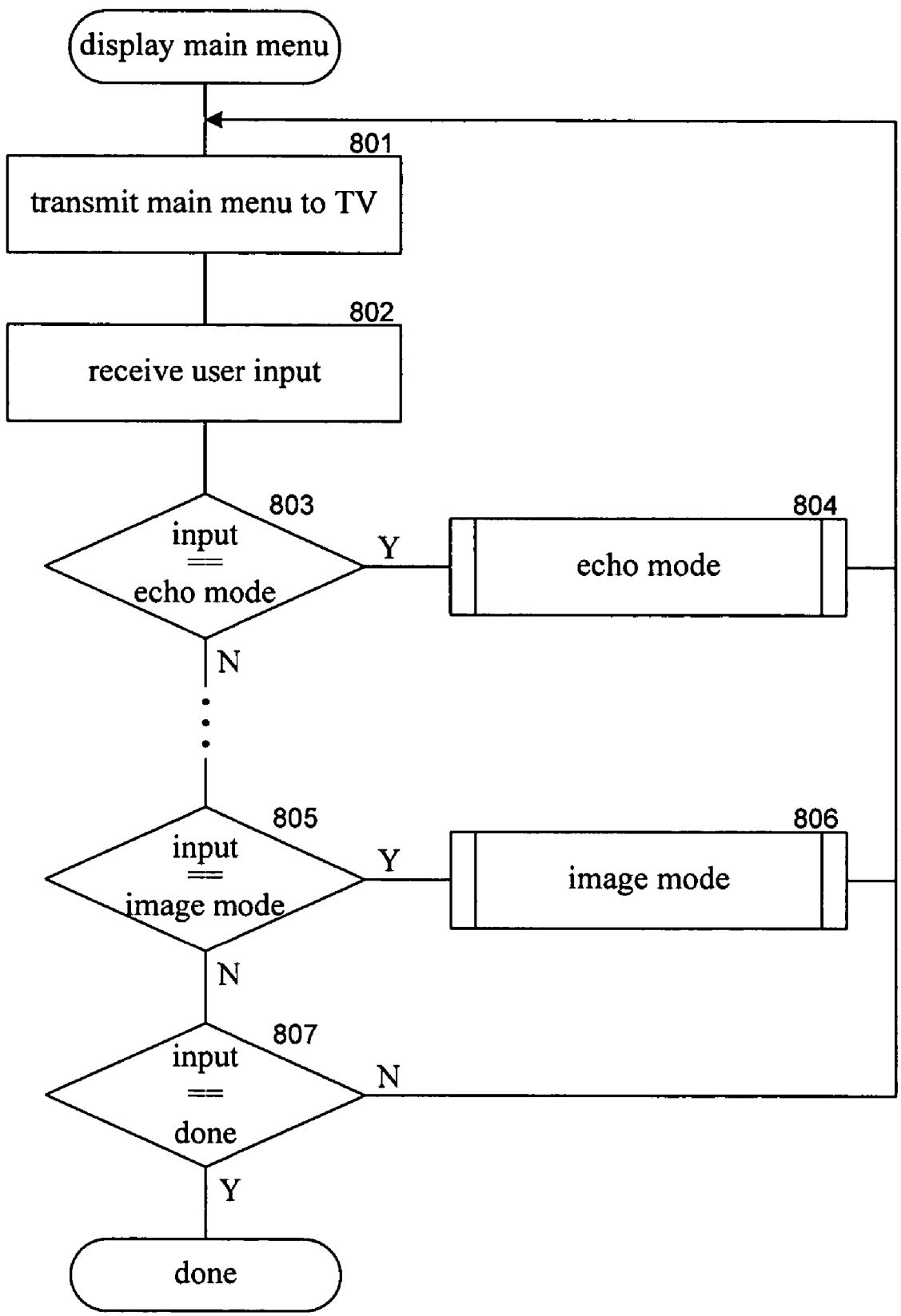
FIG. 8 is a flow diagram that illustrates the processing of the display main menu component in one embodiment.

FIG. 8 is a flow diagram that illustrates the processing of the display main menu component in one embodiment. The display main menu component is invoked when the phone-to-television device is first initialized. The component provides the user interface of the phone-to-television device. In block 801, the component displays on the television the main menu. In block 802, the component receives user input from the phone. In blocks 803-807, the component sets the mode of the phone-to-television device according to the user input. In decision block 803, if the user input indicates echo mode, then the component continues at block 804, else the component continues at block 805. In block 804, the component invokes an echo mode component to implement the echo mode of the phone-to-television device. When the echo mode component completes its processing, the component loops to block 801 to display on the television the main menu. In decision block 805, if the input indicates image mode, then the component continues at block 806, else the component continues at block 807. In block 806, the component invokes the image mode component of the phone-to-television device. When the image mode component completes its processing, the component loops to block 801 to display on the television the main menu. The ellipsis between decision block 803 and decision block 805 indicates that the user input may indicate other modes (e.g., games mode) for the phone-to-television device. In decision block 807, if the user input indicates that the user has finished, then the component completes, else the component loops to block 801 to display on the television the main menu.

Figure 9:
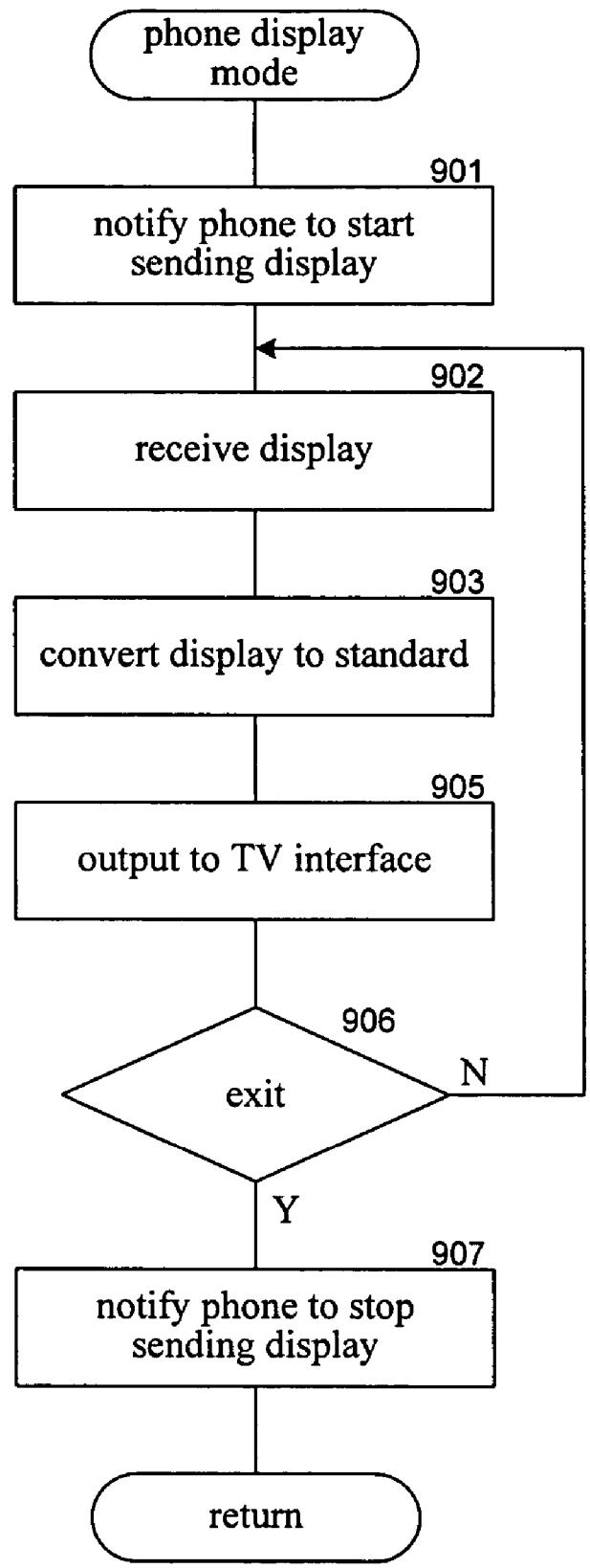
FIG. 9 is a flow diagram that illustrates the processing of the echo mode component of the phone-to-television device in one embodiment.

FIG. 9 is a flow diagram that illustrates the processing of the echo mode component of the phone-to-television device in one embodiment. When the phone-to-television device is in the echo mode, it displays the same content on the television that is currently displayed on the mobile phone. In block 901, the component notifies the mobile phone to start sending the content of its display. Some mobile phones may always output the content of their display to their external connection when they are connected to a device. In such a case, the phone-to-television device would not need to send the notification. In blocks 902-906, the component loops displaying on the television the content provided by the mobile phone until the user indicates to exit. In block 902, the component receives the content of the display from the phone interface. In block 903, the component converts the received content to a standard format. In block 905, the component provides the content to the television interface for transmission to the television. In decision block 906, if the user indicates to exit, then the component continues at block 907, else the component loops to block 902 to receive the next content. In block 907, the component notifies the phone to stop sending the content of the display and then returns.

Figure 10:
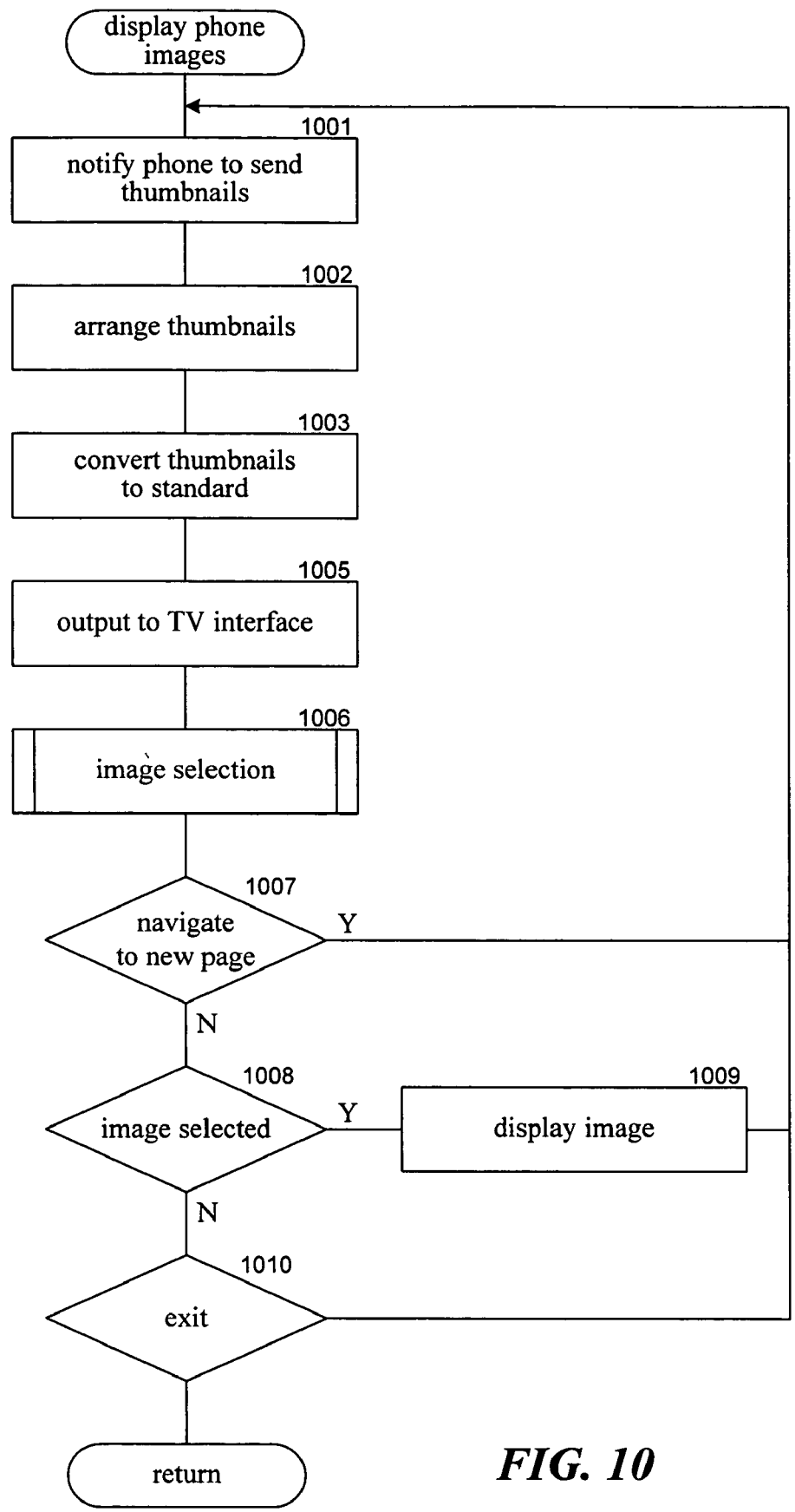
FIG. 10 is a flow diagram that illustrates the processing of the display phone images component in one embodiment.

FIG. 10 is a flow diagram that illustrates the processing of the display phone images component in one embodiment. The component is invoked when the phone-to-television device enters the phone images mode. The component receives thumbnails of the images stored within the mobile phone, allows the user to select a thumbnail, receives that image from the mobile phone, and then displays that image on the television. In block 1001, the component notifies the phone to send the thumbnails of the images. In block 1002, the component arranges the thumbnails for display. In block 1003, the component converts the arranged thumbnails to a standard format. In block 1005, the component provides the converted thumbnails to the TV interface for display on the television. In block 1006, the component invokes an image selection component to allow the user to navigate to and select a thumbnail. In decision block 1007, if the user indicated to navigate to a new page of thumbnails, then the component loops to block 1001 to notify the phone to send the thumbnails for the new page, else the component continues at block 1008. In decision block 1008, if the user indicated to select an image, then the component continues at block 1009, else the component continues at block 1010. In block 1009, the component receives the selected image from the phone and displays the image on the television until the user indicates to redisplay a page of thumbnails. The component then loops to block 1001 to receive the next page of thumbnails from the phone. In block 1010, if the user indicated to exit, then the component returns, else the component loops to block 1001 to display the next page of thumbnails.

Figure 11:
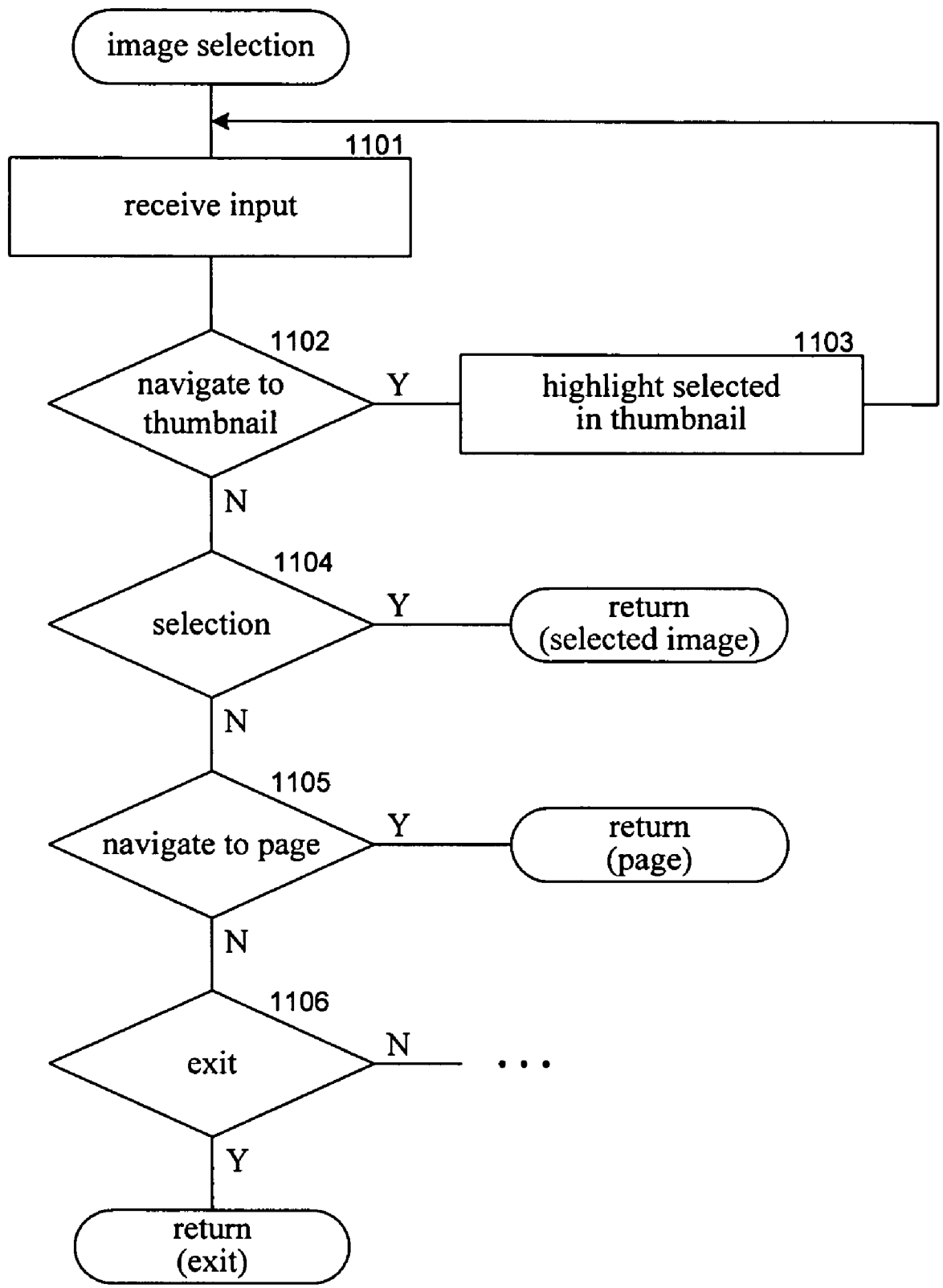
FIG. 11 is a flow diagram that illustrates the processing of the image selection component in one embodiment.

FIG. 11 is a flow diagram that illustrates the processing of the image selection component of the processing module in one embodiment. The component allows the user to navigate to each of the displayed thumbnails and select the navigated-to thumbnail of the image that is to be displayed. The component also allows a user to indicate to navigate to the next or previous page of thumbnails. In block 1101, the component receives user input. In decision block 1102, if the user input indicates to navigate to a thumbnail, then the component highlights the navigated-to thumbnail in block 1103 and loops to block 1101 to receive the next user input. In decision block 1104, if the user input indicates to select the highlighted thumbnail, then the component returns an indication of the selected thumbnail, else the component continues at block 1105. In decision block 1105, if the user indicates to display another page of thumbnails, then the component returns an indication, else the component continues at block 1106. In decision block 1106, if the user input indicates to exit, then the component returns, else the component performs other functions that the component may implement.

From the foregoing, it will be appreciated that specific embodiments of the phone-to-television device have been described herein for purposes of illustration, but that various modifications may be made without deviating from the spirit and scope of the invention. In one embodiment, the phone-to-television device may have powerful capabilities for performing sophisticated processes, such as voice recognition. In one embodiment, the phone-to-television device may be a digital signal processor that converts output from a phone into a television format. One skilled in the art will appreciate that content from the phone can be sent to the phone-to-television device for display in real-time or the content can be cached at the phone-to-television device for display not in real time. Accordingly, the invention is not limited except as by the appended claims.

We claim:

1. A device for connecting a phone with a display area to a monitor, the device comprising:
   a phone interface for
      receiving from the phone connected to the device content generated for display on the display area of the phone, the content being a markup language description of a web page that the phone received from a web site, the web page including a navigation control for navigating to another web page of the web site;
      receiving from the phone user input received via the phone directed to the web page; and
      sending to the phone requests relating to the web page to be sent to the web site so that when the received user input indicates to select the navigation control, a request to retrieve the other web page is sent to the phone;
   a monitor interface for sending content to a monitor connected to the device;
   a format converter for converting the markup language description received via the phone interface and for converting selection of navigation control to a monitor format for display of the web page on the monitor; and
   a transmission component that transmits to the monitor the converted markup language description via the monitor interface so that the monitor displays the web page.

2. The device of claim 1 wherein the content includes an image and the device includes a component for converting the image to a monitor format for displaying the converted image on the monitor.

3. The device of claim 2 including a component for receiving user input indicating an image to be displayed on the monitor.

4. The device of claim 1 wherein the content includes audio data and the device includes a component for converting the audio data to a monitor format for transmission to the monitor.

5. The device of claim 4 including a component for receiving user input indicating audio data to be output to the monitor.

6. The device of claim 1 wherein the content includes phone list data and the device includes a component for converting the phone list data to a monitor format for output to the monitor.

7. The device of claim 1 including a memory for storing data received via the phone interface for display when the phone is not connected to the phone interface.

8. The device of claim 7 wherein the data stored in memory is selected from a group consisting of news headlines, sports scores, and security prices.

9. The device of claim 1 wherein the device is connected to the phone via a wireless connection.

10. The device of claim 1 wherein the device is integrated into the monitor to which it is connected.

11. A peripheral device for connecting a phone with a display area to a phone-to-television device, the peripheral device comprising:
   a phone interface that connects to an external interface of a phone;
   a phone-to-television device interface that sends content to a phone-to-television device; and
   a component that
      receives from the phone via the phone interface a markup language description of a web page received by the phone from a web site, the web page including a navigation control for navigating to another web page;
      converts the markup language description into a format for the phone-to-television device;
      sends the converted markup language description to the phone-to-television device via the phone-to-television device interface for display on the television in real-time so that the television displays a web page specified by the markup language description received by the phone;
      receives via the phone user input directed to selecting the navigation control of the web page displayed on the television;
      sends an indication of the selection of the navigation control to the phone-to-television device interface for displaying on the television; and
      sends to the phone via the phone interface a request to retrieve the other web page.

12. The peripheral device of claim 11 wherein the peripheral device is embedded within the phone.

13. The peripheral device of claim 11 wherein the phone-to-television device interface is connected to the phone-to-television device via a wireless connection.

14. The peripheral device of claim 11 including a component for receiving commands from the phone-to-television device via the phone-to-television device interface and for sending the received commands to the phone via the phone interface.

15. A method performed by a device for connecting a phone to a monitor, the method comprising:
   receiving from the phone connected to the device a markup language description of a web page that the phone received from a web site, the web page including a navigation control for navigating to another web page;
   generating content of the web page for display on the monitor based on the markup language description received from the phone;
   sending the generated content to the monitor connected to the device;
   receiving from the phone user input received via the phone directed to the web page; and
   when the received user input indicates to select the navigation control,
      sending to the monitor an indication of selection of the navigation control; and
      sending to the phone a request to retrieve the other web page to be sent to a server by the phone.

16. The method of claim 15 wherein the monitor is a television.

17. The method of claim 15 wherein the markup language is a hypertext markup language ("HTML").

18. The method of claim 15 wherein the requests sent to the phone are hypertext transport protocol ("HTTP") requests.

* * * * *